United States Patent

Nogami

[11] Patent Number: 5,809,326
[45] Date of Patent: Sep. 15, 1998

[54] SIGNAL PROCESSOR AND METHOD OF OPERATING A SIGNAL PROCESSOR

[75] Inventor: Kazutaka Nogami, Yokohama, Japan

[73] Assignee: Kabushiki Kaisha Toshiba, Tokyo, Japan

[21] Appl. No.: 717,118

[22] Filed: Sep. 20, 1996

[30] Foreign Application Priority Data

Sep. 25, 1995 [JP] Japan .................................. 7-245626

[51] Int. Cl.⁶ .......................................................... G06F 9/00
[52] U.S. Cl. ........................................ 395/800.32; 395/580
[58] Field of Search ......................... 395/800.01, 800.23, 395/800.32, 376, 384, 392, 580, 581, 585, 586, 587, 588

[56] References Cited

U.S. PATENT DOCUMENTS

| | | | |
|---|---|---|---|
| 5,093,778 | 3/1992 | Favor et al. ............................. | 395/587 |
| 5,121,473 | 6/1992 | Hodges ................................... | 395/587 |
| 5,381,531 | 1/1995 | Hanawa et al. ......................... | 395/582 |
| 5,454,090 | 9/1995 | Fleck et al. ............................. | 395/596 |
| 5,515,518 | 5/1996 | Stiles et al. ............................. | 395/586 |
| 5,592,634 | 1/1997 | Circello et al. ......................... | 395/586 |
| 5,623,614 | 4/1997 | Van Dyke et al. ...................... | 395/587 |
| 5,708,841 | 1/1998 | Popescu et al. .................... | 395/800.23 |

Primary Examiner—Alpesh M. Shah
Attorney, Agent, or Firm—Loeb & Loeb LLP

[57] ABSTRACT

A signal processor includes an instruction buffer for sequentially storing information on instructions output from an instruction cache, and a first register that detects that an instruction enters in an instruction loop. When the instruction loop is formed, a control circuit controls the instruction buffer to supply the instruction in the instruction loop from its storage while placing the instruction cache in an inactive state.

7 Claims, 2 Drawing Sheets

SIGNAL PROCESSOR AND METHOD OF OPERATING A SIGNAL PROCESSOR

BACKGROUND OF THE INVENTION

This invention relates to a signal processor, and in particular, to a signal processor having a buffer for storing instructions in an instruction loop among instructions derived from an instruction cache.

A conventional signal processor is explained below with reference to FIG. 3. Many conventional microprocessors have an instruction cache 101 and an instruction decoder 102 as shown in FIG. 3 for supplying instructions to an Arithmetic Logic Unit (ALU). The instruction cache 101 stores desired instructions read out from a main memory (not shown) which stores instructions, and supplies an instruction 152 specified by an instruction address 151 to the instruction decoder 102. The instruction decoder 102 decodes the instruction 152 and delivers it in form of an instruction decode signal 153 to subsequent ALU. A Central Processing Unit (CPU) using such an instruction cache can read and supply instructions faster than those which read instructions directly from a main memory.

However, reading out instructions from the instruction cache into CPU increases the probability of mishits and degrades its performance as compared with direct read-out from the main memory. A typical solution to increase the hit ratio of the instruction cache is to commonly use an set-associative instruction cache for storing instructions in a plurality of cache memories. The set-associative instruction cache, however, causes a plurality of instructions to be read for specification of one address, and hence increases poser consumption as compared with direct mapping (one-way set-associative) instruction caches.

About 80% of programs processed by a CPU are typically composed of instructions for repeating the same behaviors, that is, instruction loops. An instruction loop is a set of instructions by which the same operation is repeated until, for example, data under operation reaches a value specified by a branch instruction. Therefore, before the condition specified by the branch instruction is satisfied, the same instructions are repeatedly executed, and the operation proceeds to the next instruction only after the condition is met.

Even when an instruction to be executed is involved in an instruction loop, a conventional CPU must read the instruction from the instruction cache like an instruction out of any instruction loop. The power for reading an instruction in an instruction loop from an instruction cache is the same as the power for reading it out of an instruction loop. Furthermore, the use of a set-associative instruction cache is effective to increase the hit ratio where instructions are stored out of instruction loops. However, where instructions are stored in an instruction loop, reading only repeated instructions is required and such a reading process consumes the same power as that for instructions out of instruction loops.

Therefore, in a conventional CPU, the property of instruction loops including reputation of instructions does not contribute sufficiently to power saving and an increase in operation speed. That is, because a conventional CPU read instructions from an instruction cache, either in an instruction loop or out of instruction loops, it cannot realize power saving utilizing the property of instruction loops.

SUMMARY OF THE INVENTION

It is therefore an object of the invention to reduce the average power consumption for execution of a set of instructions in a program by using an instruction buffer that stores part of instructions held in an instruction cache so that when an instruction loop is formed, the instruction buffer supplies instructions while the instruction cache is placed in an inactivate state to save power.

A further object of the invention is to reduce power consumption by placing in an inactive state the instruction cache with a set-associative construction which needs larger power than that of a direct mapping instruction cache.

A still further object of the invention is to reduce power consumed by a program counter by stopping its incremental count motion.

A yet further object of the invention is to reduce power consumed by an instruction decoder by configuring the instruction buffer to store instructions from the instruction memory after they are decoded by an placed in an inactive state decoder so that the instruction decoder may be inactivated while the instruction buffer can supply the decoded instruction signals.

According to the invention, a portion of a CPU for supplying instructions to ALU comprises: an instruction memory storing instructions; an instruction buffer having a plurality of entries for storing instructions output from the instruction memory and results of decision of conditional branch instructions among said instructions; a first register for storing addresses corresponding to the instructions stored in the instruction buffer and for specifying an address of an instruction to be transferred under control of the instruction buffer; a first comparator for comparing an address of an instruction stored in the first register to be transferred under control of the instruction buffer with an address in a program counter and for supplying a comparison result; a second comparator for comparing a result of decision of a conditional branch instruction stored in the instruction buffer with a result of decision of the condition of a currently executed conditional branch instruction and for supplying a comparison result; and a control circuit responsive to the comparison results from the first comparator and from the second comparator to control operations of the instruction buffer and the instruction memory.

When an instruction loop is formed by a conditional branch instruction among instructions output from the instruction memory, instructions are output from the instruction buffer as long as the instructions are held in the buffer or until the comparison result of the second comparator indicates non-coincidence.

DETAILED DESCRIPTION OF THE PREFERRED EMBODIMENTS

Figure 1:
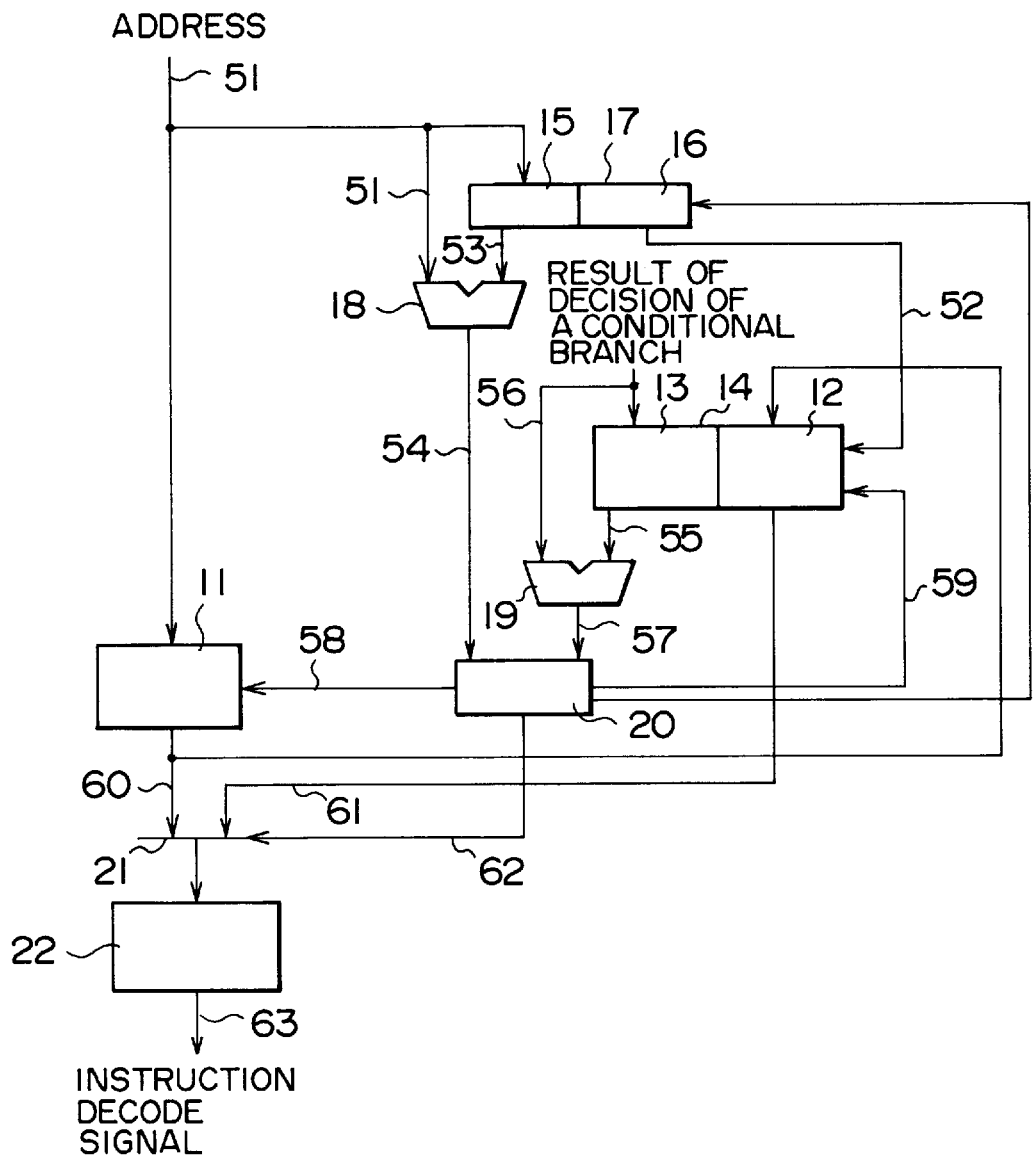
FIG. 1 is a circuit diagram illustrating a first embodiment of the invention.

The first embodiment of the invention is explained below with reference to FIG. 1.

First explained is an arrangement of the part for supplying instructions to an ALU according to the invention.

The circuit according to the first embodiment includes, in addition to an instruction cache 11 and an instruction decoder 22, an instruction buffer 14, first register 17, first comparator 18, second comparator 19, control circuit 20, multiplexer 21, and others. The instruction cache 11 stores data selected from a main storage device. The instruction buffer 14 includes a memory 12 for sequentially storing instructions output from the instruction cache 11 in response to instruction addresses 51 generated from a program counter (not shown), and a memory 13 for storing branch decisions in instructions stored in the memory 12. The number of instructions that can be stored in the instruction buffer 14, i.e. the size of the instruction buffer 14, may be determined appropriately. As to the branch decisions, bits or like means are set for respective instructions indicating exit from an instruction loop, entry into an instruction loop, and so forth. The first register 17 includes a memory 15 for storing a start address of the instruction upon entry into an instruction loop, and a memory 16 for storing the entry number (a value indicating the position of the instructions in the instruction buffer 14) in the instruction buffer 14 corresponding to the start address and for supplying the instruction buffer 14 with a signal 52 specifying the entry. Storage of the address and the entry number in the first register 17 can be controlled appropriately by the control circuit 20, etc. The first comparator 18 compares the first address 53 upon entry into the instruction loop stored in the first register 17 with the instruction address 51 generated by the program counter, and supplies a coincidence or non-coincidence signal 54. The second comparator 19 compares result of a condition decision 55 of a conditional branch instruction stored in the instruction buffer 14 with that of a condition decision 56 of a currently executed conditional branch instruction output from the ALU, and supplies a coincidence or non-coincidence signal 57. The control circuit 20 receives the coincidence or non-coincidence signals 54, 57 from the first and second comparators 18 and 19 and supplies an instruction 58 for activating or placing in an inactive state the instruction cache 11 and a signal 59 causing the instruction buffer 14 to output the instruction. The multiplexer 21 chooses an instruction 60 output from the instruction cache 11 or an instruction 61 output from the instruction buffer 14 in response to a control signal 62 from the control circuit 20. The instruction 60 from the instruction cache 11 or the instruction 61 from the instruction buffer 14, which was chosen by the multiplexer 21, is sent the instruction decoder 22 which decodes it and outputs an instruction decode signal 63 to a device such as an ALU (not shown). The decode signal 63 is then output to an operational device or the like, which executes an operation according to the decoded instruction.

Next explained are behaviors of the device according to the invention.

Instructions given to an ALU in a CPU are typically a series of instructions in a program. While the program is executed, there are some portions in which an instruction loop is formed between a certain instruction and another instruction, and instructions in the instruction loop are executed repeatedly as long as the conditions for a certain branch instruction are not satisfied. There are other portions in which no instruction loop is formed, and only one instruction is sequentially executed without repeating instructions. However, instructions are output in the order of addresses of the program until a certain conditional branch instruction appears.

In the circuit of the invention, while an instruction loop is not formed, the memory 12 of the instruction buffer 14 sequentially reads out and stores instructions 60 which are output from the instruction cache 11 according to the instruction address 51 generated from the program counter. Then, the memory 13 in the instruction buffer 14, which stores branch decisions, stores the result of a decision of a conditional branch output from ALU in response to an instruction given to ALU. If the instruction buffer 14 is activated in a First-In First-Out (FIFO) order, for example, then it can store the result of a condition decision 56 from ALU corresponding to the number of entries in the instruction buffer 14 in the ordering from the newest output instruction from the instruction cache 11.

The program instructions proceed in response to the address counter 51 until an instruction commanding a branch into an instruction with a small-numbered address is executed according to a certain conditional branch instruction, an instruction loop in the program is formed.

If the number of addresses of an instruction specified by the conditional branch instruction from the address of the currently executed instruction, i.e. the number of addresses jumping back from the address, is smaller than the entry number of the instruction buffer 14, then the first register 17, which comprises the memory 15 storing the start address of the instruction upon entry into the instruction loop and the memory 16 for storing the entry in the instruction buffer 14 corresponding to the address and for outputting the signal 52 specifying the entry to the instruction buffer 14, determines the jump destination address and determines a corresponding entry in the instruction buffer 11.

In this case, since all instructions in the loop formed are contained in instructions held in the instruction buffer 14, any instruction necessary for the instruction loop can be output from the instructions held in the instruction buffer 14. In this case, therefore, the first comparator 18 compares the first address 53 upon entry into the instruction loop with the instruction address 51 generated from the program counter, and supplies the coincidence signal 54 to the control circuit 20 which in turn issues the instruction 58 to place the instruction cache 11 in an inactive state. The program counter (not shown) can be stopped together with the instruction cache 11. The control signal 62 from the control circuit 20 causes the multiplexer 21 to choose the instruction 61 from the instruction buffer 14.

If the number of the addresses of an instruction specified by a conditional branch instruction from the address prior to the currently executed instruction, i.e. the number of addresses jumping back from the address, is larger than the entry number of the instruction buffer 14, then it is difficult to supply all instructions necessary for the instruction loop from the instructions held in the instruction buffer 14. In this case, the address prior to the address of an instruction to be branched by the number of entries of the instruction buffer 14, i.e. the address of the instruction stored oldest and currently held in the instruction buffer 14, is set by the first register 17, and the corresponding first entry in the instruction buffer 14 is set. Then, an instruction necessary for the instruction loop but not held in the instruction buffer 14 is supplied from the instruction cache 11 by activating the program counter (not shown) and activating the instruction cache 11 in the same manner as that for instructions not forming any instruction loop.

In this case, the controller circuit 20 supplies a signal for activating the instruction cache 11 in response to the incoincidence signal 54 from the first comparator 18, and simultaneously supplies the control signal 62 to switch the multiplexer 21 and to permit the instruction cache 11 to issue the instruction to decoder 22.

While the instruction is supplied from the instruction cache 11, the instruction buffer 14 does not receive new instructions but has stored the instructions that are read out before the instruction loop is formed.

While the instruction cache 11 supplies instructions sequentially, if the address of the instruction in the instruction loop coincides with the address of the oldest instruction held in the instruction buffer 14, the first comparator 18 outputs the coincidence signal 54 that indicates coincidence between the address 53 from the memory 15 storing the first address of the instruction upon entry into the instruction loop and the instruction address 51 generated by the program counter. In receipt of the coincidence signal 54, the control circuit 20 places the instruction cache 11 in an inactive state and the program counter (not shown). Also, the control circuit 20 permits the instruction buffer 14 to supply the instruction from its storage and changes the multiplexer to choose the instruction from the instruction buffer 14. When another conditional branch instruction appears while the instruction buffer 14 supplies instructions, the same behaviors are repeated depending on the result of decision of the condition, such that instructions held in the instruction buffer 14 are supplied from the instruction buffer 14 and instructions not held in the instruction buffer 14 are supplied from the instruction cache 11.

Exit of the program from an instruction loop is detected from the output 57 of the second comparator 19. The instruction buffer 14 stores in its memory 13 the decision result of the conditional branch instruction in the currently executed instruction. This result 55 and the decision result of the conditional branch after execution of operation responsive to an instruction given to ALU are supplied to the second comparator 19. Exit from the instruction loop is detected from the output 57 of the second comparator 19 by detecting, for example, whether the result is different from the result of the condition decision of the conditional branch instruction executed before or whether the job proceeded to the instruction at an address prior to the instructions held in the instruction buffer 14. In this case, judgement is made that the instruction loop have been solved because the conditional branch instruction satisfies the condition. Then, the instruction buffer 14 invalidates its all entries, and the instruction cache 11 and the program counter (not shown) are activated again to allow the instruction buffer 14 to read out instructions supplied from the instruction cache 11 and decision results of conditional branches so that the above behaviors are repeated when a program enters into an instruction loop.

Figure 2:
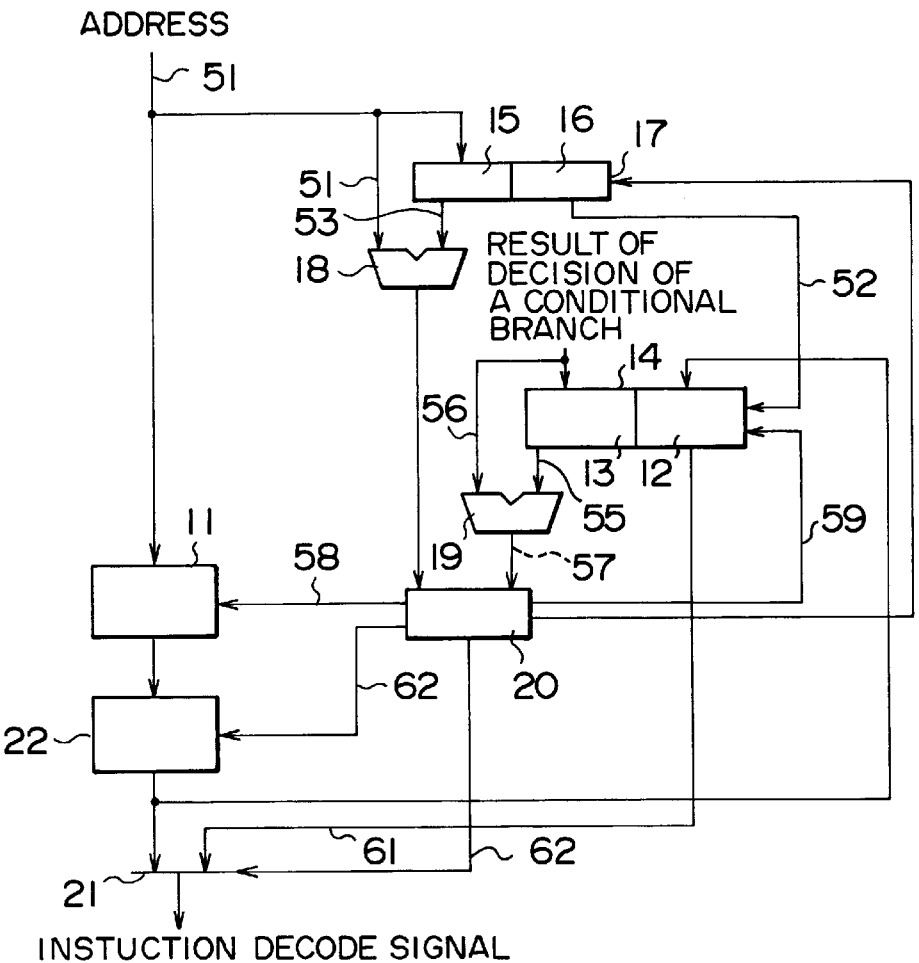
FIG. 2 is circuit diagram illustrating a second embodiment of the invention.
Figure 3:
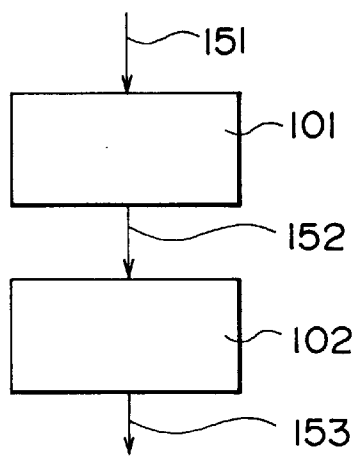
FIG. 3 is a circuit diagram illustrating a conventional example.

Next explained is the second embodiment of the invention with reference to FIG. 2.

The instruction buffer in the first embodiment is connected to directly receive outputs from the instruction cache so that the instruction decoder can decode instructions from the instruction cache or the instruction buffer depending on whether an instruction loop is formed or not. When a program enters in an instruction loop, the first embodiment places the instruction cache in an inactive state supplies instructions from the instruction buffer, supplies the instructions from the instruction buffer to the instruction decoder, and sends the decoded instructions to a device, such as an ALU in the subsequent stage.

Taking it into consideration, the second embodiment is designed so that the instruction buffer stores instructions from the instruction cache in form of instruction decode signals after decoded by the instruction decoder. An arrangement for this purpose can be realized by the circuit as shown in FIG. 2.

The arrangement of FIG. 2 is a modification of the first embodiment, in which the instruction buffer stores instruction decode signals indicating instructions in lieu of directly storing instructions supplied from the instruction cache. Most part of the second embodiment is substantially the same as the first embodiment, and equivalent components or elements are labelled with the same reference numerals.

One of main changes from the first embodiment is that outputs from the instruction cache 11 are decoded by the instruction decoder 22 before they are read out into the instruction buffer 14 so that the instruction buffer 14 reads out the instruction in form of instruction decode signals from the instruction decoder 22. Another main change is that control signals delivered from the control circuit 20 to the instruction cache 11 are supplied also to the instruction decoder 22 so that both the instruction cache and the instruction decoder are placed in an inactive state while the instruction buffer 14 supplies instruction decode signals. In the other respect, the second embodiment is the same as the first embodiment.

What is claimed is:

1. A signal processor comprising:

an instruction memory storing instructions;

an instruction buffer having a plurality of entries for storing instructions output from said instruction memory and results of decision of conditional branch instructions among said instructions;

a first register for storing addresses corresponding to said instructions stored in said instruction buffer and for specifying an address of an instruction to be transferred under control of said instruction buffer;

a first comparator for comparing said address of the instruction stored in said first register to be transferred under control of said instruction buffer with an address in a program counter and for supplying a comparison result;

a second comparator for comparing a result of decision of a conditional branch instruction stored in said instruction buffer with a result of decision of the condition of a currently executed conditional branch instruction and for supplying a comparison result; and a control circuit responsive to said comparison results from said first and second comparator for controlling operations of said instruction buffer and said instruction memory, wherein, when an instruction loop is formed by a—conditional branch instruction among instructions output from said instruction memory, instructions are output from said instruction buffer from the instruction of the address by said first register until the last instruction stored in said instruction buffer or until said comparison result of said second comparator indicates non-coincidence.

2. The signal processor according to claim 1, wherein said control circuit places said instruction memory in an inactive state when said instruction loop is formed.

3. The signal processor according to claim 1, wherein said second comparator compares the result of decision of a conditional branch instruction stored in said instruction buffer with a result of condition decision of a conditional branch instruction under current execution, and places said instruction memory in an inactive state upon detecting exit from said instruction loop by non-coincidence between said results.

4. The signal processor according to claim 1, further comprising an instruction decoder, wherein said instructions stored in said instruction buffer are decoded instructions decoded from outputs of said instruction memory by said instruction decoder.

5. The signal processor according to claim 1, further comprising an instruction selector circuit controlled by said control circuit to select and output one of an output from said instruction memory and an output from said instruction buffer.

6. In a signal processor comprising:

a first instruction memory storing instructions;

a second instruction memory for storing instructions selected from said first memory and for supplying a specific instruction in response to an address signal;

a decode circuit for reading and decoding said specific instruction output from said second memory; and an operation circuit for executing an operation in response to said instruction decoded by said decode circuit, an improvement comprising:

a third instruction memory for sequentially storing said specific instruction output from said second instruction memory in response to said address signal;

a control circuit for controlling behaviors of said second instruction memory and said third instruction memory; and a register for specifying an address in said third instruction memory corresponding to an address in said second instruction memory, wherein, when said specific instruction output from said second instruction memory is again output, said control circuit places said second instruction memory in an inactive state and permits said third memory to supply said specific instruction at said address specified by said register.

7. The signal processor according to claim 6, wherein said instructions stored in said third instruction memory are decoded instructions decoded from outputs of said second instruction memory by said instruction decoder.

* * * * *